US009118738B2

(12) United States Patent
Archer et al.

(10) Patent No.: US 9,118,738 B2
(45) Date of Patent: Aug. 25, 2015

(54) SYSTEMS AND METHODS FOR CONTROLLING ACCESS TO A MEDIA STREAM

(71) Applicant: Avvasi Inc., Waterloo (CA)

(72) Inventors: Michael Archer, Cambridge (CA); Mate Prgin, Waterloo (CA); Dan Eble, Kitchener (CA); Anthony Joch, Waterloo (CA); Michael Gallant, Kitchener (CA)

(73) Assignee: Avvasi Inc., Waterloo (CA)

( * ) Notice: Subject to any disclaimer, the term of this patent is extended or adjusted under 35 U.S.C. 154(b) by 0 days.

(21) Appl. No.: 13/630,326

(22) Filed: Sep. 28, 2012

(65) Prior Publication Data

US 2013/0086631 A1    Apr. 4, 2013

Related U.S. Application Data

(60) Provisional application No. 61/541,049, filed on Sep. 29, 2011.

(51) Int. Cl.
*G06F 17/00* (2006.01)
*H04L 29/06* (2006.01)

(52) U.S. Cl.
CPC ............ *H04L 65/4084* (2013.01); *H04L 63/10* (2013.01); *H04L 65/605* (2013.01); *H04L 65/80* (2013.01)

(58) Field of Classification Search
CPC ... H04L 65/4084; H04L 65/605; H04L 65/80; H04L 63/10
USPC ........ 726/1, 26, 29; 709/203; 710/36; 725/95
See application file for complete search history.

(56) References Cited

U.S. PATENT DOCUMENTS 6,195,680 B1 *  2/2001  Goldszmidt et al. .......... 709/203
6,211,901 B1 *  4/2001  Imajima et al. ................. 725/93

(Continued)

FOREIGN PATENT DOCUMENTS

CA    2632885    6/2007
CA    2737476    6/2010

(Continued)

OTHER PUBLICATIONS

Previously co-pending U.S. Appl. No. 12/540,773, "Enabling Streaming to a Media Player Without Native Streaming Support", issued as U.S. Pat. No. 8,719,437, May 6, 2014.

(Continued)

*Primary Examiner* — Matthew Smithers
*Assistant Examiner* — Gregory M Elmore
(74) *Attorney, Agent, or Firm* — Bereskin & Parr LLP/S.E.N.C.R.L., s.r.l.

(57) ABSTRACT

Systems and methods of controlling access to a multimedia stream in a media streaming session from a multimedia server to a requesting device via a network. The systems and methods facilitate receiving a primary request for the multimedia stream from the requesting device; determining whether to allow access to the primary request from the requesting device in accordance with at least one media session policy; and if access is permitted, then generating a secondary request corresponding to the primary request; providing the secondary request to the multimedia server; receiving a first multimedia stream from the multimedia server in response to the secondary request; determining whether to transmit the first multimedia stream or a second multimedia stream based on the at least one media session policy; and transmitting either the first multimedia stream or the second multimedia stream to the requesting device as indicated by the at least one media session policy.

18 Claims, 8 Drawing Sheets

(56) References Cited

U.S. PATENT DOCUMENTS

| | | | |
|---|---|---|---|
| 6,678,245 B1 | | 1/2004 | Cooper et al. |
| 8,159,520 B1* | | 4/2012 | Dhanoa et al. ............. 348/14.02 |
| 8,290,038 B1 | | 10/2012 | Wang et al. |
| 8,307,108 B2* | | 11/2012 | Chen et al. ..................... 709/231 |
| 8,719,437 B1 | | 5/2014 | Bazzarella et al. |
| 2001/0009548 A1 | | 7/2001 | Morris |
| 2002/0002708 A1* | | 1/2002 | Arye ............................... 725/95 |
| 2002/0095493 A1 | | 7/2002 | Byrnes |
| 2002/0138599 A1 | | 9/2002 | Dilman et al. |
| 2003/0088876 A1* | | 5/2003 | Mao et al. ....................... 725/91 |
| 2004/0261094 A1* | | 12/2004 | Huslak et al. ................... 725/25 |
| 2004/0261101 A1* | | 12/2004 | Iwamura ......................... 725/32 |
| 2005/0041584 A1 | | 2/2005 | Lau et al. |
| 2005/0157660 A1 | | 7/2005 | Mandato et al. |
| 2005/0289618 A1 | | 12/2005 | Hardin |
| 2006/0085862 A1* | | 4/2006 | Witt et al. ....................... 726/26 |
| 2007/0011246 A1* | | 1/2007 | Wu ................................ 709/206 |
| 2007/0211631 A1 | | 9/2007 | Rahman et al. |
| 2007/0294373 A1* | | 12/2007 | Harrison ........................ 709/219 |
| 2008/0037552 A1 | | 2/2008 | Dos Remedios et al. |
| 2008/0049615 A1 | | 2/2008 | Bugenhagen |
| 2008/0155087 A1 | | 6/2008 | Blouin et al. |
| 2008/0195761 A1 | | 8/2008 | Jabri et al. |
| 2008/0205389 A1 | | 8/2008 | Fang et al. |
| 2008/0298286 A1* | | 12/2008 | Bowser ......................... 370/310 |
| 2009/0063693 A1 | | 3/2009 | Bond et al. |
| 2009/0172685 A1 | | 7/2009 | Shavit |
| 2009/0238088 A1 | | 9/2009 | Tan |
| 2009/0287764 A1* | | 11/2009 | Pazhyannur et al. ......... 709/203 |
| 2010/0002582 A1 | | 1/2010 | Luft et al. |
| 2010/0071053 A1* | | 3/2010 | Ansari et al. .................... 726/12 |
| 2010/0296402 A1 | | 11/2010 | Fraccalvieri et al. |
| 2011/0051646 A1* | | 3/2011 | Rice ............................... 370/312 |
| 2011/0228859 A1 | | 9/2011 | Sugimoto et al. |
| 2011/0302643 A1* | | 12/2011 | Pichna et al. ..................... 726/7 |
| 2012/0117225 A1 | | 5/2012 | Kordasiewicz et al. |
| 2012/0139940 A1* | | 6/2012 | Chavanne .................... 345/629 |
| 2012/0250570 A1 | | 10/2012 | Parker |
| 2012/0284370 A1* | | 11/2012 | Hierro ........................... 709/219 |
| 2013/0086279 A1 | | 4/2013 | Archer et al. |
| 2013/0297743 A1 | | 11/2013 | Eschet |
| 2013/0301415 A1 | | 11/2013 | Archer et al. |
| 2013/0304934 A1 | | 11/2013 | Joch et al. |
| 2013/0311667 A1 | | 11/2013 | Payette et al. |
| 2014/0008200 A1 | | 1/2014 | Motorola |
| 2014/0181266 A1 | | 6/2014 | Joch et al. |

FOREIGN PATENT DOCUMENTS

| | | |
|---|---|---|
| CN | 101345756 | 1/2009 |
| WO | 2009015461 | 2/2009 |
| WO | 2011154512 | 12/2011 |

OTHER PUBLICATIONS

Document relating to U.S. Appl. No. 12/540,773, dated Aug. 13, 2009 (Prosecution History).
Co-pending U.S. Appl. No. 13/894,797, "System and Method for Dynamic Policy Evaluation", filed May 15, 2013.
Co-pending U.S. Appl. No. 13/852,796, "Methods and Systems for Controlling Quality of a Media Session", filed Mar. 28, 2013.
Moore, B. et al., RFC 3460: "Policy Core Information Model (PCIM) Extensions", IETF Networking Group, Jan. 2003, 95 pages.

* cited by examiner

SYSTEMS AND METHODS FOR CONTROLLING ACCESS TO A MEDIA STREAM

CROSS-REFERENCE TO RELATED APPLICATION

This application claims the benefit of U.S. Provisional Patent Application No. 61/541,049, entitled "Video Busy Signal", filed Sep. 29, 2011. The entire contents of U.S. Provisional Patent Application No. 61/541,049 are hereby incorporated by reference.

FIELD

The described embodiments relate to controlling access of multimedia content in streaming sessions.

BACKGROUND

Streaming multimedia content from various multimedia sources over various computer networks is becoming increasingly popular. Streaming has become an important element of the "Internet" experience through the significant availability of content from sites like YouTube™, Netflix® and many others. Due to growing demands for streaming multimedia content, modern cellular networks service an increasingly large amount of bandwidth enabled by multi-media smartphones and tablets.

However, since multimedia services geared towards real-time entertainment contribute significantly to the amount of traffic on these networks, they impose significant load for the organizations that provide and distribute them. Network operators and multimedia content providers and distributors are limited in their ability to control access of multimedia streams by subscribers or users. This may result in bandwidth shortages and degraded user experiences.

SUMMARY

In a broad aspect, there is provided a method of controlling access to a multimedia stream in a media streaming session from a multimedia server to a requesting device via a network, the method comprising: receiving a primary request for the multimedia stream from the requesting device; determining whether to allow access to the primary request from the requesting device in accordance with at least one policy; if access is permitted, then: generating a secondary request corresponding to the primary request; providing the secondary request to the multimedia server; receiving a first multimedia stream from the multimedia server in response to the secondary request; determining whether to transmit the first multimedia stream or a second multimedia stream based on the at least one policy; transmitting either the first multimedia stream or the second multimedia stream indicated by the at least one policy to the requesting device.

In some cases, the at least one policy comprises a media session policy. In some cases, the secondary request corresponds directly to the primary request. In some cases, the first multimedia stream is unprocessed.

The method may further comprise: identifying at least a policy condition in the network in which the first multimedia stream or the second multimedia stream is to be transmitted to the requesting device; and modifying the first multimedia stream based on the policy condition in the network to generate the second multimedia stream.

In some cases, the second multimedia stream is selected from the group consisting of a processed version of the first multimedia stream, a processed version of an alternative stream, an unprocessed version of the alternative stream, a processed version of a combination of the first multimedia stream and the alternative stream, and an unprocessed version of the combination of the first multimedia stream and the alternative stream.

The method may further comprise generating a busy notification content, wherein the alternative stream comprises the busy notification content.

In some cases, the busy notification content comprises a video overlay. In some cases, the busy notification content is customized based on a criteria selected from a group consisting of a subscriber, a subscription tier, roaming status, one or more attributes associated with the first multimedia stream, a device type, a device model, a network location, a location capacity, a site, a service, a time of day, and a predicted QoE.

In some cases, generating the busy notification content comprises providing an indication of a reason for the busy notification content.

The method may further comprise multiplexing an audio stream of the first multimedia stream received from the multimedia server with a video stream of the alternative stream.

In some cases, the second multimedia stream is formed by inserting the alternative stream prior to the first multimedia stream.

The method may further comprise transcoding the second multimedia stream to reduce a bandwidth requirement.

The method may further comprise providing an option to increase priority of at least one future time slot, the at least one future time slot identifying a time slot during which the requesting device begins receiving the first multimedia stream.

In some cases, providing an option to increase priority of the at least one future time slot comprises accepting one or more reservation tokens from the requesting device to increase priority of the future time slot. In some cases, the number of reservation tokens used to increase priority of the at least one future time slot is based on a subscription tier associated with the requesting device. In some cases, the number of reservation tokens used to increase priority of the at least one future time slot is based on a location of the requesting device. In some cases, when the option to increase priority of the at least one future time slot is used by the requesting device, the requesting device may receive increased priority of the first multimedia stream at the future time slot. In some cases, when the option to increase priority of the at least one future time slot is used by the requesting device, the requesting device may receive increased priority of the first multimedia stream after a fixed delay. In some cases, providing the option to increase priority of the at least one future time slot comprises transmitting an advertisement stream to the requesting device and subsequently providing one or more tokens for reserving the at least one future time slot.

The method may further comprise providing a request-repeat message, the request-repeat message identifying a time at which the requesting device is permitted to repeat the primary request.

The method may further comprise providing an option to the requesting device to download a multimedia content other than in real-time, wherein the multimedia content is based on the first multimedia stream.

In some cases, the option to download the multimedia content is based on the profile of the requesting device. In some cases, the option to download the multimedia content is based on a player used in the requesting device for playback.

In another broad aspect, there is provided a system for controlling access to a multimedia stream in a media streaming session from a multimedia server to a requesting device via a network, the system comprising: a switching element configured to receive a primary request for the multimedia stream from the requesting device; a policy system configured to determine whether to allow access to the primary request from the requesting device in accordance with at least one policy, and wherein, if access is permitted, the system is configured to: generate a secondary request corresponding to the primary request; provide the secondary request to the multimedia server; receive a first multimedia stream from the multimedia server in response to the secondary request; determine whether to transmit the first multimedia stream or a second multimedia stream based on the at least one policy; transmit either the first multimedia stream or the second multimedia stream indicated by the at least one policy to the requesting device.

In some cases, the at least one policy comprises a media session policy. In some cases, the secondary request corresponds directly to the primary request. In some cases, the first multimedia stream is unprocessed.

In some cases, the system is further configured to monitor data traffic in the network.

The system may further comprise a packet processing element configured to identify the multimedia stream corresponding to the multimedia streaming session in the data traffic.

In some cases, the system is further configured to: identify congestion policy condition in the network in which the first multimedia stream or the second multimedia stream is to be transmitted to the requesting device; and modify the first multimedia stream based on the policy condition in the network to generate the second multimedia stream.

In some cases, the second multimedia stream is selected from the group consisting of a processed version of the first multimedia stream, a processed version of an alternative stream, an unprocessed version of the alternative stream, a processed version of a combination of the first multimedia stream and the alternative stream, and an unprocessed version of the combination of the first multimedia stream and the alternative stream.

In some cases, the system is further configured to generate a busy notification content, wherein the alternative stream comprises the busy notification content.

In some cases, the busy notification content comprises a video overlay.

In some cases, the busy notification content is customized based on a criteria selected from a group consisting of a subscriber, a subscription tier, roaming status, one or more attributes associated with the first multimedia stream, a device type, a device model, a network location, a location capacity, a site, a service, a time of day, and a predicted QoE.

In some cases, generating the busy notification content comprises providing an indication of a reason for the busy notification content.

In some cases, the system is further configured to multiplex an audio stream of the first multimedia stream received from the multimedia server with a video stream of the alternative stream to generate the second multimedia stream.

In some cases, the second multimedia stream is formed by inserting the alternative stream prior to the first multimedia stream.

In some cases, the system is further configured to transcode the second multimedia stream to reduce a bandwidth requirement.

In some cases, the system is further configured to provide an option to increase priority of at least one future time slot, the at least one future time slot identifying a time slot during which the switching element begins transmitting the first multimedia stream to the requesting device.

In some cases, providing an option to increase priority of the at least one future time slot comprises accepting one or more reservation tokens from the requesting device to increase priority of the future time slot. In some cases, the number of reservation tokens used to increase priority of the at least one future time slot is based on a subscription tier associated with the requesting device. In some cases, the number of reservation tokens used to increase priority of the at least one future time slot is based on a location of the requesting device. In some cases, when the option to increase priority of the at least one future time slot is used by the requesting device, the requesting device may receive increased priority of the first multimedia stream at the future time slot. In some cases, when the option to increase priority of the at least one future time slot is used by the requesting device, the requesting device may receive increased priority of the first multimedia stream after a fixed delay. In some cases, providing the option to increase priority of the at least one future time slot comprises transmitting an advertisement stream to the requesting device and subsequently providing one or more tokens for reserving the at least one future time slot. In some cases, the system is further configured to provide a request-repeat message, the request-repeat message identifying a time at which the requesting device is permitted to repeat the primary request.

In some cases, the system is further configured to provide an option to the requesting device to download a multimedia content other than in real-time, wherein the multimedia content is based on the first multimedia stream.

In some cases, the option to download the multimedia content is based on the profile of the requesting device. In some cases, the option to download the multimedia content is based on a player used in the requesting device for playback.

In a broad aspect, some embodiments provide a method of controlling access to a multimedia stream in a media streaming session from a multimedia server to a requesting device via a network. The method may comprise receiving a primary request for the multimedia stream from the requesting device; determining whether to allow access to the primary request from the requesting device in accordance with at least one policy; and if access is permitted, then generating a secondary request corresponding to the primary request; providing the secondary request to the multimedia server; receiving a first multimedia stream from the multimedia server in response to the secondary request; determining whether to transmit the first multimedia stream or a second multimedia stream based on the at least one policy; and transmitting a response to the requesting device. The response may either be the first multimedia stream or the second multimedia stream indicated by the at least one policy.

In some cases, when access to the primary request of the requesting device is not permitted based on at least one policy, the primary request is blocked or discarded. This may effectively end the multimedia streaming session.

In some other cases, when access to the primary request of the requesting device is not permitted, a request-repeat option is provided where if the primary request is repeated at a time or time slot identified in the request-repeat option, the requesting device may receive increased priority or guaranteed playback of the multimedia stream identified in the primary request.

In some further cases, when access to the primary request of the requesting device is not permitted, a reservation token option is provided where if the primary request is re-sent in exchange for a reservation token, the requesting device may receive increased priority or guaranteed playback of the multimedia stream identified in the primary request.

In various cases, the request-repeat option may increase priority of or guarantee playback of the first multimedia stream in its original or transcoded form. Similarly, the reservation token option may increase priority of or guarantee playback of the first multimedia stream in its original or transcoded form.

In some cases, the secondary request corresponds directly to the primary request. For example, the secondary request is the same as the primary request. In some other cases, the secondary request is a modified or a processed version of the primary request.

The second multimedia stream may be selected from the group consisting of processed versions of the first multimedia stream, processed or unprocessed versions of an alternative stream (such as, for example, a busy notification content etc.), and processed or unprocessed versions of a combination of all or portions of the first multimedia stream with all or portions of the alternative stream.

In some cases, the second multimedia stream may comprise busy notification content to be substituted at the requesting client or device. For example, busy notification content may be pre-stored at the client, or retrieved from a third party.

Examples of a combination of all or portions of the first multimedia stream with all or portions of the alternative stream may include splicing an alternative stream with the first multimedia stream. The splicing may be at any location within the first multimedia stream and the alternative stream. Other examples may include re-multiplexing of audio portions of the first multimedia stream with video portions of the alternative stream or vice versa. Another example may comprise generating thumbnail images or still images of video portions of the first multimedia stream or alternative stream for interspersing in the second multimedia stream (in such cases, thumbnails of the alternative stream may be provided first in the second multimedia stream, to provide users with an indication of what is occurring). In some rare cases, the video component of the first multimedia stream may be re-multiplexed with audio components of the alternative stream.

Processing of multimedia content, such as processing of the first multimedia stream, the alternative stream or combinations of the first multimedia stream and the alternative stream may comprise one or more of transcoding, splicing, stream substitution (e.g. clip replacement via stream switching), stream overlaying, re-multiplexing, etc. Overlaying may comprise "watermarking" a video or simply inserting an opaque overlay on a video.

The alternative stream may comprise multimedia content other than or unrelated to the first multimedia stream. For example, the alternative stream may comprise busy notification content.

In some cases, the busy notification content may be provided in response to an indication from an external server, such as a PCRF/PCEF server. This may occur, for example, on demand or upon request in response to a busy indication in the second multimedia stream. The busy notification content may or may not be cached locally on the device or service gateway system. In some other cases, the busy notification content may be generated locally on the device or service gateway system. In some cases, generating the busy notification content may include an indication of a reason for busy notification.

The busy notification content may be customized or targeted based on, e.g., the subscriber, the subscription tier, roaming status, attributes of the first multimedia stream (clip duration, resolution, bit rate), device type, device model, network location, location capacity (sessions, media bandwidth, delivered bandwidth, congested status), site or service, time of day, predicted QoE, PCC rules, or combinations thereof.

The method may further comprise providing an option to increase priority of or reserve at least one future time slot, the at least one future time slot identifying a time slot during which the requesting device begins receiving the first multimedia stream. Providing an option to increase priority of or reserve the at least one future time slot may comprise accepting one or more reservation tokens from the requesting device to increase priority of or reserve the future time slot.

The number of reservation tokens used to increase priority of or reserve the at least one future time slot may be based on some or all of the network state, the target QoE, the usage pattern, the stream type, the device profile, the time of the day, the PCC rules, the subscription tier associated with the subscriber, the requesting device and the nature of the primary request etc.

In some cases, the requesting device may receive increased priority or guaranteed playback of the first multimedia stream at the future time slot when the option to increase priority of or reserve the at least one future time slot is used by the requesting device. In some other cases, the requesting device may receive increased priority or guaranteed playback of the first multimedia stream after a fixed delay when the option to increase priority of or reserve the at least one future time slot is used by the requesting device.

Providing the option to increase priority of or reserve the at least one future time slot may also comprise transmitting an advertisement stream to the requesting device and subsequently providing one or more tokens for reserving the at least one future time slot.

The method may further comprise providing a request-repeat message, the request-repeat message identifying a time at which the requesting device is permitted to repeat the primary request to receive an increased priority or guaranteed playback of the first multimedia stream.

The method may further comprise providing an option to the requesting device to download a multimedia content other than in real-time, wherein the multimedia content is based on the first multimedia stream. For example, the multimedia content may be a transcoded version of the first multimedia stream.

In some cases, the option to download the multimedia content may be based on the capabilities of the requesting device or media player used in the requesting device for playback.

The method may further comprise providing a download complete notification to the requesting device when the multimedia content is completely downloaded.

In a broad aspect, some embodiments provide a system for controlling access to a multimedia stream in a media streaming session from a multimedia server to a requesting device via a network. The system may comprise a policy system configured to determine an action to be applied to the multimedia stream in the media streaming session based at least on the network data; a switching and input/output element configured to receive, inspect, modify, and/or forward, monitor data traffic in the network; a media processing element configured to process the multimedia stream in the multimedia streaming session based on the action; and a packet processing element configured to identify the multimedia stream corresponding to the multimedia streaming session in the data traffic. In some cases, further processing of the multimedia stream may be performed in the multimedia streaming session based on the action.

The system is further configured to receive a primary request for the multimedia stream from the requesting device, determine whether to allow access to the primary request from the requesting device in accordance with at least one policy by, for example, determining whether the at least one policy is met, and generate a secondary request corresponding to the primary request and providing the secondary request to the multimedia server if access is permitted. The system is further configured to receive a first multimedia stream from the multimedia server in response to the secondary request, determine whether to transmit the first multimedia stream or a second multimedia stream to the requesting device based on the at least one policy, and transmit either the first multimedia stream or the second multimedia stream to the requesting device as indicated by the at least one policy.

BRIEF DESCRIPTION OF THE DRAWINGS

Preferred embodiments of the present invention will now be described in detail with reference to the drawings, in which.

Figure 1:
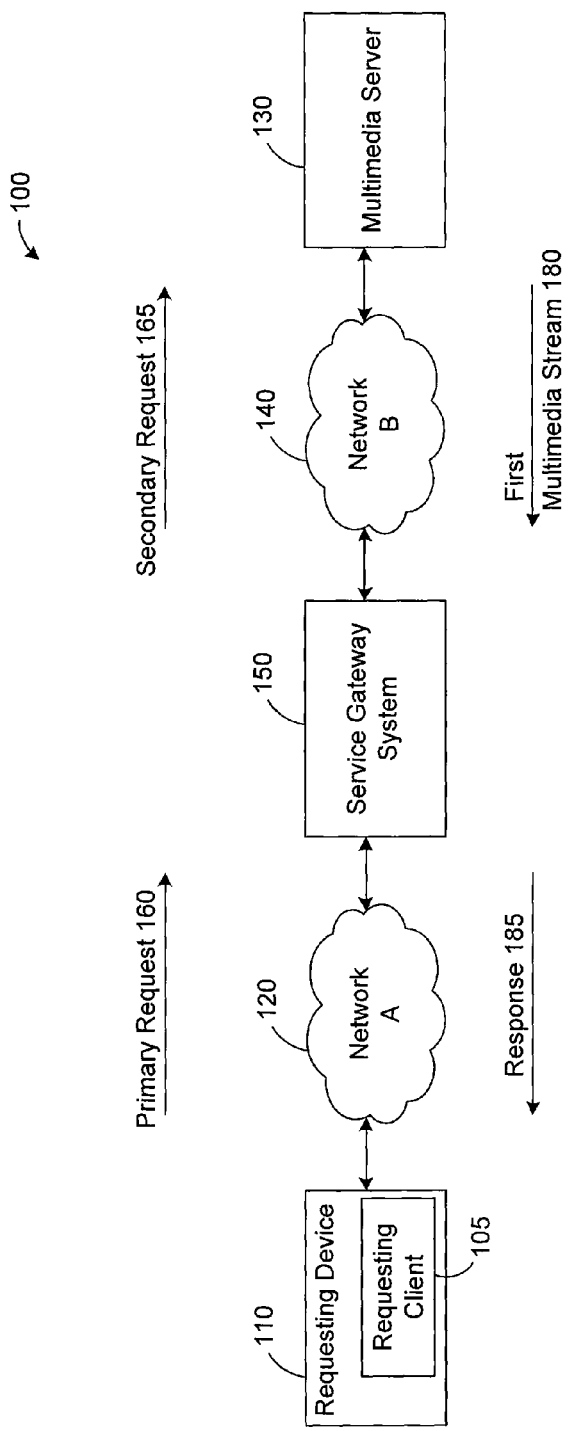
FIG. 1 is a block diagram of components interacting with a service gateway system in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

Detailed Description

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g. ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

The described embodiments may generally provide systems and methods to control access to a multimedia stream in a streaming session to manage multimedia traffic in wired and wireless communication networks. Access control is a concept whereby subscribers, or new media sessions, or both, are validated to determine whether they will be permitted on a particular network or system. In the case of a video session, it may be known that watching the video content requires a predetermined amount of bandwidth. Thus, in situations where network resources are scarce (or if the experience is predicted to be poor for the new media session or unacceptably degraded for ongoing media sessions), access control may be used to prevent establishment of a new media session.

The manner in which access control is enforced and carried out can be distressing or annoying to subscribers. Moreover, some forms of enforcing access control, such as silently disconnecting or discarding a media session, may give subscribers the false impression that an error or malfunction has occurred. In such cases, subscribers may attempt to re-establish media sessions, creating additional load and increasing their level of frustration as further access control results in a further access control action.

To overcome this disadvantage, the described embodiments can provide a notification to the subscriber that the desired service has been prevented by access control. The notification can also provide a detailed message describing the purpose of the access control, the reasons for the access control action and, in some cases, optional acts that may allow re-establishment of the service or media session.

Accordingly, network operators are able to control access to media sessions while providing the subscriber alternative means for viewing the content.

The embodiments described herein may be used in conjunction with systems and methods for providing congestion estimation in a communications network, which can be found, for example, in co-pending U.S. Provisional Application No. 61/407,527. The embodiments described herein may also be used in conjunction with systems and methods for estimating Quality of Experience (QoE) of media streams, which can be found, for example, in co-pending U.S. Provisional Application No. 61/407,531.

Reference is first made to FIG. 1, illustrating a block diagram of components interacting with a service gateway system in accordance with an example system embodiment. System 100 generally comprises a requesting device 110, a requesting client 105, a multimedia server 130, a service gateway system 150, network A 120 connecting the requesting device 110 to the service gateway system 150 and network B 140 connecting the multimedia server 130 to the service gateway system 150.

Network A 120 and Network B 140 may be any networks capable of carrying data including the Internet, public switched telephone network (PSTN), or any other suitable local area network (LAN), wide area network (WAN), mobile data networks (e.g., Universal Mobile Telecommunications System (UMTS), 3GPP Long-Term Evolution Advanced (LTE Advanced), Worldwide Interoperability for Microwave Access (WiMAX), etc.) and combinations thereof. In some cases, network A 120 and network B 140 may be part of the same network (e.g., Internet).

Although not shown, requesting device 110, multimedia server 130, and other components may connect to networks A 120 and B 140 via a firewall, which is a device, set of devices or software that inspects network traffic passing through it, and denies or permits passage based on a set of rules and other criteria. Firewall may be adapted to permit, deny, encrypt, decrypt, or proxy all computer traffic through network A 120 and network B 140 based upon a set of rules and other criteria. For example, firewall may be a network layer firewall, an application layer firewall, a proxy server, or a firewall with network address translation functionality.

The requesting device 110 may be any networked computing device comprising a processor and memory, such as a personal computer, workstation, server, portable computer, mobile device, personal digital assistant, laptop, smart phone, WAP phone, an interactive television, video display terminals, gaming consoles, an electronic reading device, and portable electronic devices or a combination of these. The requesting device 110 is operable to send or transmit primary requests 160, as described further herein.

In various embodiments, the requesting device 110 comprises a requesting client 105 which may be a computing application, application plug-in, a widget, instant messaging application, mobile device application, e-mail application, online telephony application, java application, web page, or web object stored and executed on the requesting device 110 in order to send or transmit one or more primary requests 160.

The multimedia server 130 may comprise one or more servers with computing processing abilities and memory such as database(s) or file system(s). Although only one multimedia server 130 is shown for clarity, there may be multiple multimedia servers 130 or groups of multimedia servers 130 distributed over a wide geographic area and connected via, for example, network B 140. This can include centralized and distributed cache configurations, proxies, as well as content delivery networks (CDNs). The multimedia server 130 may be any server that can provide access to multimedia content, such as video and audio content in a streaming session by, for example, storing and transmitting the multimedia content. The multimedia server 130 may also comprise a server storing a wide variety of user-generated content, including movies, movie clips, TV shows, TV clips, music videos, video blogging and short original videos etc. Examples may include websites such as YouTube™ and Netflix®, etc. The multimedia server 130 may also include a plurality of versions of the same multimedia content, such as, for example, different formats or resolutions of the same multimedia content. For example, a multimedia server may store the same movie clip in two or more video resolutions, such as 360p, 480p, 720p, 1080i or 1080p. Likewise, the multimedia server 130 may store the same movie clip in two or more video formats, such as WebM or Moving Picture Experts Group MPEG-4 Advanced Video Coding (MPEG-4 AVC).

A multimedia streaming session commences in response to a primary request 160 for multimedia content from a requesting device 110 and/or requesting client 105. For a session to be considered a multimedia streaming session, it is not necessary for the session to conclude with a multimedia stream being received by the requesting device 110 in response to the primary request 160. A session may be considered a multimedia streaming session even if a primary request 160 for multimedia content from a requesting device 110 is denied.

In some embodiments, a multimedia stream in a multimedia streaming session may be provided over a reliable transport protocol such as Transmission Control Protocol (TCP).

The service gateway system 150 may be a server system that has one or more servers with computing processing abilities and memory such as database(s) or file system(s). Although only one service gateway system 150 is shown for clarity, there may be multiple service gateway systems 150 distributed over a wide geographic area and connected via, for example, network A 120 or network B 140. Service gateway system 150 has a network interface for connecting to networks A 120 and B 140 in order to communicate with and serve other components of system 100. The service gateway system 150 may be implemented in hardware, software or a combination of hardware and/or software. In some embodiments, the service gateway system 150 may be located at the requesting device 110.

Typically, a requesting device 110 or a requesting client 105 sends a request, such as a primary request 160, to a multimedia server 130. The request identifies multimedia content that the requesting device 110 and/or requesting client 105 wish to receive and stream (e.g., request for instantaneous playback on a display associated with the requesting device 110). In response, the multimedia server 130 may provide the first multimedia stream to the requesting device 110.

The service gateway system 150 may be operable to limit or control access to the primary request 160 by the multimedia server 130. The service gateway system 150 may also be operable to limit or control access to multimedia streams transmitted from the multimedia server 130 to the requesting device 110. In some embodiments, all primary requests 160 transmitted from the requesting device 110 are intercepted by the service gateway system 150 before reaching the multimedia server 130. Accordingly, the service gateway system 150 may block or discard the primary request 160 and effectively end the multimedia streaming session. Alternately, the service gateway system 150 may determine to forward the primary request 160 to the multimedia server 130 in its original form or to modify the primary request 160 prior to forwarding. In some other embodiments, the service gateway system 150 monitors the primary request 160 transmitted from the requesting device 110 and intercepts the primary request 160 on an as-needed basis, such as, for example, upon detecting subscription tier of the requesting device 110, upon detecting the time of the day the primary request 160 is received, or upon receiving a notification from the network operator or another network node.

The service gateway system 150 may be operable to determine whether to allow access to the primary request 160 based on an individual or aggregate policy. A policy may comprise all subscriber, location or media session policies or criteria used by the service gateway system 150 to make determinations, such as, for example, whether to forward the primary request 160 to the multimedia server 130 in unmodified form. A policy may also be used to determine, for example, how to modify a primary request 160 before re-transmitting it to the multimedia server 130.

Generally, a policy may be a set of rules determining specific actions to be taken in response to a policy condition regarding the subscriber, location, or media session (e.g., whether to permit the media session or take some other action), based on one or more input criteria. Policy input may vary depending on the nature of the policy condition input and its source. An example of a policy condition for a location policy may be a limit on the number of media sessions for a particular cell node. An example of a policy condition for a media session policy may be a limit on the bitrate for a media session.

The service gateway system 150 is operable to generate and/or provide a secondary request 165 to the multimedia server. The secondary request 165 may be generated and/or provided in response to a determination based on a policy. The secondary request 165 may be the same as the primary request 160, or an alternative request based on the primary request 160. The alternative request may be a modified version of the primary request 160, such as, for example, a request for the same multimedia content as included in the primary request 160 but in a different format or resolution.

In some cases, service gateway system 150 may determine, based on the policy, to block or discard the primary request 160 as received from the requesting device and prevent the request from reaching the multimedia server 130. In such cases, the multimedia server 130 will not receive the request and the request can be treated as if it was never sent.

The service gateway system 150 is also operable to receive a first multimedia stream 180 in response to the secondary request 165. In some embodiments, the service gateway system 150 is operable to intercept all transmission of the first version of the multimedia stream 180 from the multimedia server 130 before forwarding the first version, or some second version of the multimedia stream, to the requesting device 110. In some other embodiments, the service gateway system 150 is operable to monitor the transmission of the first version of the multimedia server 180 to the requesting device 110 and intercept the stream on an as-needed basis, such as, for example, upon detecting severe congestion in the network or upon receiving a notification from the network operator, another network node etc.

The service gateway system 150 is operable to determine whether to transmit the first multimedia stream (as received from the multimedia server 130) or second multimedia stream as a response 185 to the requesting device 110. Such a determination can be made by the service gateway system 150 based on a policy.

The first multimedia stream 180 may be any multimedia content that is transmitted by the multimedia server 130 in response to the secondary request 165. The first multimedia stream 180 may be the same version of the multimedia content as requested in the secondary request 165. Provided the secondary request 165 corresponds to the unmodified primary request 160, the first multimedia stream 180 may be the same version of the multimedia content as requested in the primary request 160. The first multimedia stream 180 may also be some other version of the multimedia content requested in the secondary request 165.

If the policy allows, the service gateway system 150 may be configured to transmit the first multimedia stream as a response 185 to the requesting device 110. If the policy disallows transmitting the first multimedia stream, the service gateway system 150 may be configured to transmit the second multimedia stream to the requesting device 110.

The second multimedia stream may comprise a processed version of the first multimedia stream. The second multimedia stream may also comprise processed or unprocessed versions of an alternative content (such as, for example, a busy notification content etc.).

The second multimedia stream may also comprise a combination of modified or unmodified versions of the first multimedia stream and a modified or unmodified version of alternative content (such as, for example, a busy notification content). For example, busy notification content may be spliced into a modified or unmodified first multimedia stream, either "pre-roll" (i.e., before the desired multimedia stream content), "post-roll" (i.e., after the desired multimedia stream content), or "interstitial" (i.e., in the midst of the desired multimedia stream content).

The second multimedia stream may also comprise a modified or unmodified audio portion of the first multimedia stream received from the multimedia server multiplexed with a video stream of the busy notification content. The second multimedia stream may also comprise a modified or unmodified audio portion of the first multimedia stream received from the multimedia server multiplexed with thumbnails of a video stream of the first multimedia stream, along with busy notification content.

In some cases, the second multimedia stream may be further transcoded to reduce a bandwidth requirement to transmit the second multimedia stream, for example by reducing bitrate, resolution and the like.

The service gateway system 150 may store pre-generated busy notification content in memory in a plurality of different formats. Upon a determination of the format suitable for playback at the requesting device 110 and/or requesting client 105, the busy notification content in the suitable format can be provided to the requesting device 110. The pre-generated busy notification content may be received upon request from external sources. The pre-generated busy notification content may alternatively be locally generated within the service gateway system 150.

In some cases, busy notification content may be combined with the first multimedia portion, by inserting the busy notification content prior to the first multimedia portion. In such cases, the resulting second multimedia stream may be transcoded to reduce the bandwidth requirement to a suitable level.

In some embodiments, the same policy may be used to determine whether to forward the primary request 160 to the multimedia server 130 and whether to forward the first multimedia stream 180 to the requesting device 110. In some other embodiments, separate media session policies may be used to evaluate the primary request 160 and the first multimedia stream 180 for transmission to and from the multimedia server 130. In various embodiments, more than one policy may be used by the service gateway system 150 to make determinations.

Figure 2A:
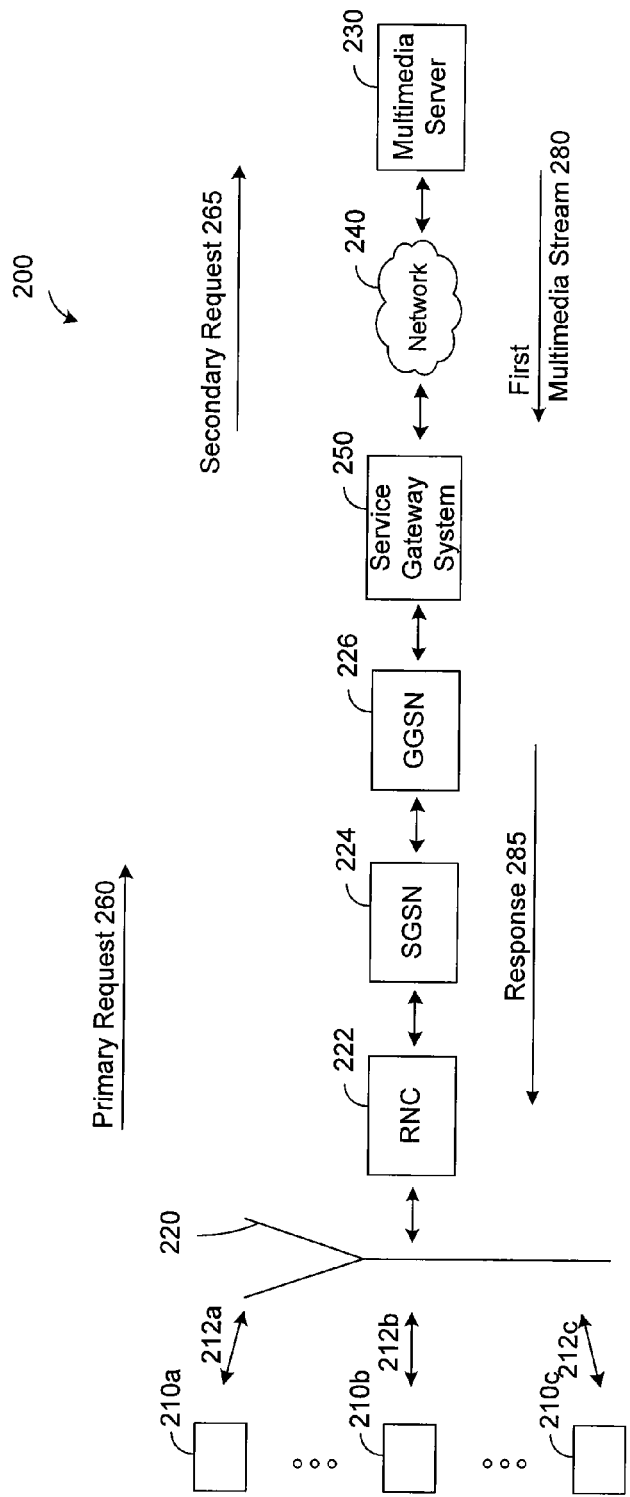
FIG. 2A is a block diagram of components interacting with a service gateway system in a "3G" implementation of mobile data network in accordance with another exemplary system embodiment.

Reference is now made to FIG. 2A illustrating a block diagram of components interacting with a service gateway system in a "3G" implementation of mobile data network in accordance with another example system embodiment. System 200 includes a number of requesting devices 210a-210c, at least one access device 220, a Radio Network Controller (RNC) 222, a Service Gateway Support Node (SGSN) 224, a Gateway General Support Node (GGSN) 226, a service gateway system 250 and one or more multimedia servers 230. As shown, the service gateway system 250 is coupled to one or more multimedia servers 230 via network 240.

The user devices 210a-210c may be implemented as cellular phones, smart phones, Personal Digital Assistants (PDAs) or other user devices capable of media streaming or playback. In the example shown, the system 200 includes a Universal Terrestrial Radio Access Network (UTRAN) that connects to a network 240 such as the Internet or other wide area network that includes one or more multimedia servers 230 that are capable of supplying multimedia content, such as streaming video or other media to the client devices 210a-210c. The access device 220 may be implemented via Node B base stations. The access devices 220, such as access points, home gateways, or other wired or wireless access devices may also be implemented in other ways to meet the design criteria of a particular implementation.

Each of the user devices 210a-210c may present one or more data packets containing one or more primary requests 260 through one or more links 212a-212c to one or more of the access devices 220. The data packets from the user devices 210a-210c may be received as flows (or data flows) by one or more of the access devices 220. A flow may be considered a conversation between any two devices on a network such as client devices 210a-210c, multimedia servers 230 or other components. Such a conversation may be carried out by sending packets back and forth along one or more links (e.g., 212a-212c etc.) used to connect the devices. Packets from several flows may travel over the same links. In general, there will be several flows operating on a given link at any point in time. The devices 210a-210c may send the data packets to a core network (e.g., the SGSN 224, RNC 222 and GGSN 226) of a cell provider using one or more wired links 212a-212c. Similarly, a secondary request 265, a first multimedia stream 280 in response to the secondary request 265 and a response 285 (e.g. the first multimedia stream 280 or second multimedia stream) are sent as packets using links (not shown).

The service gateway system 250 may be a server system, such as service gateway system 150 of FIG. 1.

In some embodiments, the service gateway system 250 is placed between the core network (e.g., the SGSN 224, RNC 222 and GGSN 226) and the network 240 connecting the core network to the multimedia server 230, as illustrated in FIG. 2A. However, in other embodiments, the service gateway system 250 may be located within the core network, such as, for example, between the Radio Network Controller (RNC) 222 and the Service Gateway Support Node (SGSN) 224, or between the SGSN 224 and the Gateway General Support Node (GGSN) 226. In still other embodiments, the service gateway system 250 may operate as a proxy, wherein the service gateway system 250 may not be physically between the core network and the network 240, but in which some or all data traffic between client devices 210a-210c and multimedia server 230 is routed through the service gateway system 250.

Figure 2B:
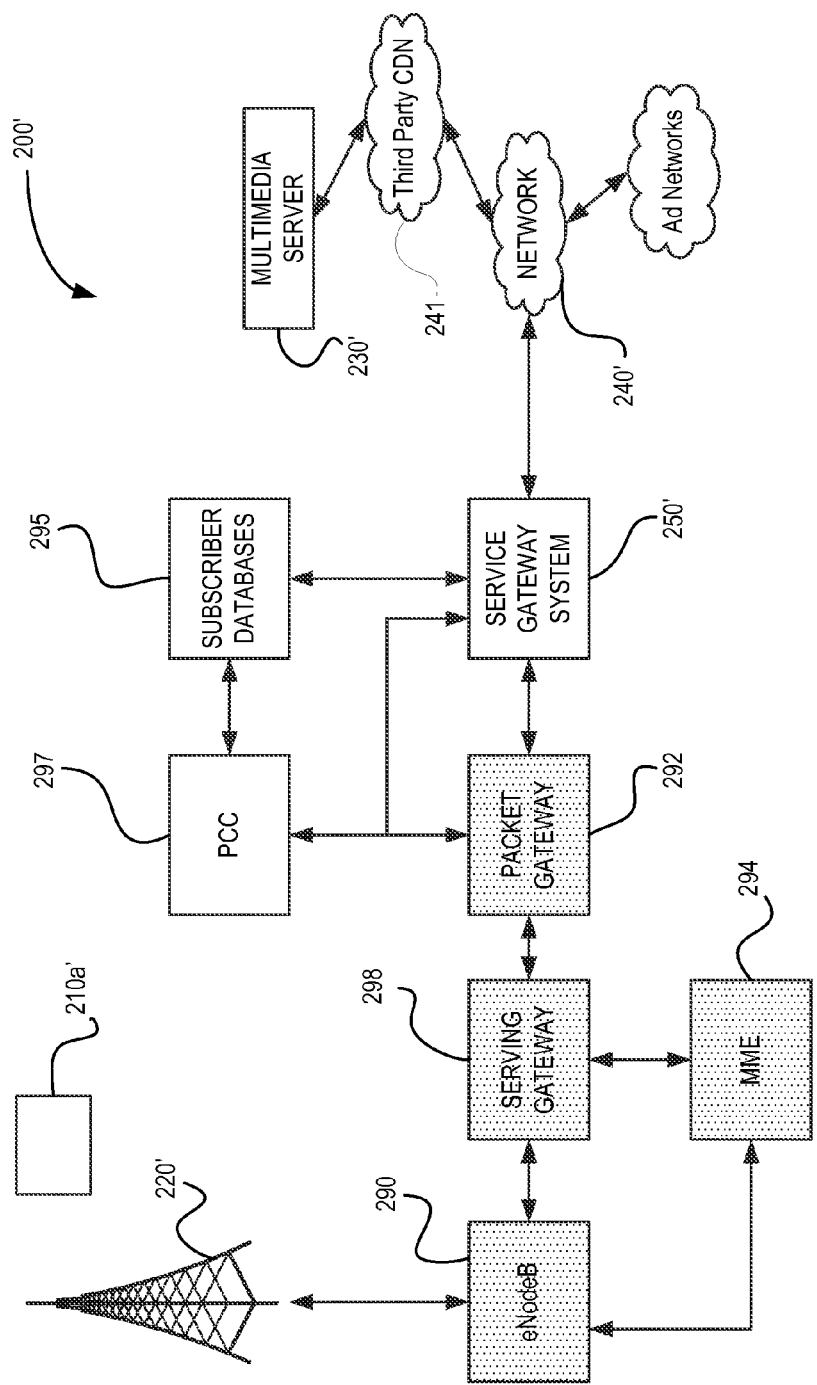
FIG. 2B is a block diagram of components interacting with a service gateway system in a "4G" implementation of mobile data network in accordance with another exemplary system embodiment.

Referring now to FIG. 2B, there is illustrated a service gateway system in a "4G" implementation of mobile data network in accordance with another exemplary system embodiment. System 200' includes a number of requesting devices, such as device 210a', similar to requesting devices 210a-210c, at least one access device 220', similar to at least one access device 220. System 200' is generally analogous to system 200 except that network elements with different capabilities may be provided.

System 200' comprises the service gateway system 250', similar to the service gateway system 250. System 200' also comprises a packet gateway 292, an Evolved Node B (eNodeB) 290, a serving gateway 298 and a mobile management entity (MME) 294. Various other network elements commonly deployed in a 4G mobile data network are omitted for simplicity and clarity.

A PCC server 297 may interface with packet gateway 292 and service gateway system 250' to support PCRF/PCEF services. Accordingly, PCC server 297 may have access to one or more subscriber databases 295. It will be appreciated that a PCC server and subscriber databases may similarly be provided in system 200 of FIG. 2A.

System 200' further comprises one or more multimedia servers 230' coupled to the service gateway system 250' via network 240'. Multimedia servers 230' may be coupled to the network 240' via a third party CDN 241.

As with system 200, service gateway system 250' may also be operated as a proxy in some embodiments.

Figure 3:
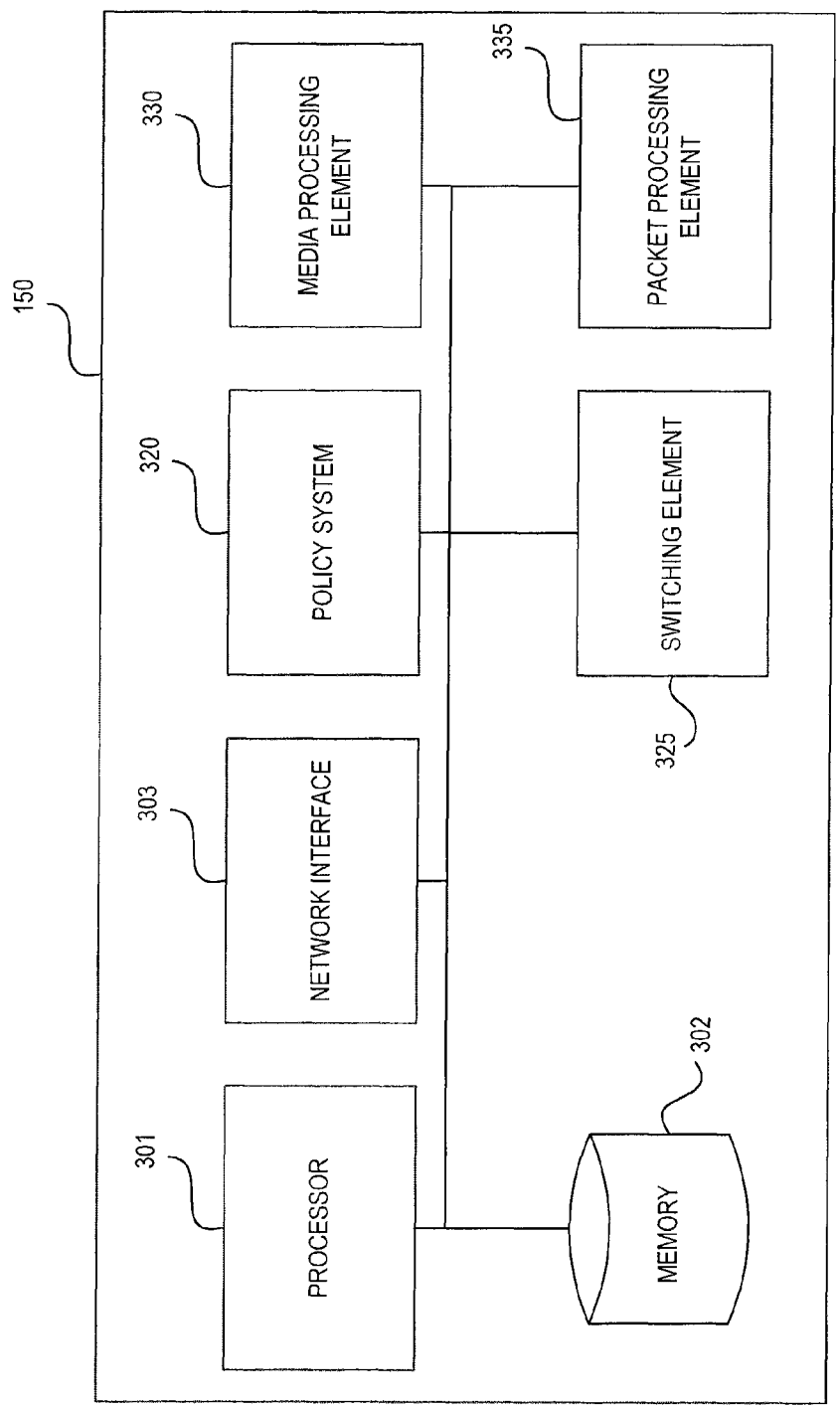
FIG. 3 is a simplified block diagram of an exemplary service gateway system.

Reference is next made to FIG. 3 illustrating a simplified block diagram of a service gateway system, such as the service gateway system 150 in accordance with an example embodiment.

The service gateway system 150 may comprise a processor 301, a memory 302, one or more network interfaces 303 and one or more communications interfaces (not shown). Service gateway system 150 may be configured to provide a policy system 320, a switching and input/output element 325, a media processing element 330 and a packet processing element 335. In general, the respective elements may be implemented as software modules stored in memory 302 and executed by one on or more processors 301. In some variant embodiments, the elements may be implemented as hardware modules (e.g., an application specific integrated circuit or field programmable gate array).

Memory 302 may comprise storage, such as a database, to store and retrieve data, such as subscriber information, for various other elements in the service gateway system 150, such as, for example, the policy system 320. In some cases, subscriber information may be based on subscriber database data obtained from external subscriber database 130. Subscriber database data may include quotas and policies specific to the user and/or a subscription tier. The subscriber database may be accessed via protocols such as Diameter, Lightweight Directory Access Protocol (LDAP), web services or other proprietary protocols. Subscriber database data may be enhanced with subscriber information available to media service gateway 135, e.g. a usage pattern associated with the subscriber, types of multimedia contents requested by the subscriber in the past, the current multimedia content requested by the subscriber, time of the day the request is made and location of the subscriber making the current request, etc. In some cases, subscriber information may also include data relating to the identified client device, which can be used to determine device capabilities (e.g., screen resolution, codec support, etc.). The device database may comprise a database such as Wireless Universal Resource File (WURFL) or User Agent Profile (UAProf). The subscriber information stored in the memory 302 may also include information regarding a number of tokens the user is entitled to and the number of tokens the user has already used, as described in greater detail herein. Other types of information present in the user records may include policies specific to the user, and/or a subscription tier.

Switching and input/output element 325 may be a storage and processing element that implements control and data plane traffic load balancing across packet processing elements 335, internal control and data plane traffic switching between elements, and multiple traffic intersection modes, providing most or all external data input/output to service gateway system 150.

Load balancing may be used to distribute traffic from a large number of subscribers evenly across packet processing elements 335. This distribution allows high bandwidth links to be processed without overloading any single packet processing element 335. Internal switching may be used to move traffic between elements in the service gateway system 150 or between multiple service gateway systems.

Service gateway system 150 may operate in one or more of a number of intersection modes. These intersection modes may facilitate active management, which permits access control. For active management, switching and input/output element 325 may be configured in a bump-in-the-wire configuration, i.e., to forward all packets to one or more packet processing elements 335 where management logic may be applied. In the case of active management, packets forwarded internally for further processing may be modified before being placed back on the wire.

Switching and input/output element 325 may be configured to route data, such as the primary request 160 and/or the first multimedia stream 180, between a multimedia content provider, such as the multimedia server 130 and a client device, such as the requesting device 110.

Media processing element 330 may be a storage and processing module that can manipulate or process multimedia content within media sessions. Media processing element 330 may manipulate multimedia content, such as the primary request and/or the first multimedia stream, based on a policy decision from a policy system 320.

Media processing element 330 may perform inline, real-time, audio and video transcoding of selected media sessions. Media processing element 330 may also be configured for an off-line, batch conversion workflow mode. Such an offline mode can be used to generate additional streams for a particular media content item at a variety of bit rates and resolutions as idle resources become available. This can be desirable where a particular media content item is frequently delivered in a variety of network conditions.

Media processing element 330 may generally perform bit rate reduction. In some cases, it may be beneficial for media processing element 330 to perform sampling rate reduction, e.g. spatial resolution and/or frame rate for video, reducing sample frequency and/or number of channels for audio. In some other cases, it may be beneficial for media processing element 330 to perform format conversion for improved compression efficiency, whereby the output media stream being encoded may be converted to a different, more efficient, format than that of the input media stream being decoded (e.g., H.264/AVC vs. MPEG-4 part 2).

Media processing element 330 may manipulate multimedia content, such as, for example, the first multimedia stream 180 by performing format conversion, resolution conversion, frame-rate conversion and/or bit-rate conversion. In some cases, the media processing element 330 may perform conversion by decoding a media stream, such as the first multimedia stream 180, and re-encoding using new parameters.

Media processing element 330 may further manipulate multimedia content, such as, for example, the first multimedia stream 180 by, for example, splicing all or portions of the first multimedia stream 180 with all or portions of the alternative stream, re-multiplexing all or portions of the audio or video component of the first multimedia stream 180 with all or portions of the video or audio components of the alternative stream, transcoding all or portions of the first multimedia stream 180 with all or portions of the alternative stream, etc.

Packet processing element 335 may analyze the network traffic across all layers of the TCP/IP networking stack, identify media sessions and apply policy. Packet processing element 335 may support packet forwarding, dropping, or modifying incoming packets, after further processing, by proxying TCP connections.

Packet processing element 335 may find and parse the IP layer (IPv4/IPv6) in the packet, perform IP de-fragmentation, and associate the packets with their transport layer flows. Packet processing element 335 may also find, parse, and process the transport layer (e.g., TCP, UDP, etc.) and keep track of when packets are sent and received, including when packets are acknowledged (or lost) by the client, to permit modeling of the client video buffer. Packet processing element 335 also may find, parse, and process the application layer content (e.g., HTTP, RTSP, RTMP, etc.). Once the application type has been identified, packet processing element 335 may be responsible for detecting media sessions. Once a media session is detected, packet processing element 335 may also find, parse, and process media containers (e.g., FLV, MP4, ASF etc.) and associated metadata (e.g., gzipped content, manifest files, etc.). Packet processing element 335 may also find, parse, and process elementary streams (e.g. including H.264/MPEG-4 AVC, AAC, etc.). Processing may be governed by relevant and applicable subscriber, location, and media session policies from the policy system 320.

Packet processing element 335 may support the application of access control to subscribers, locations, or media sessions, as governed by policy. This action may be useful for example in situations where network resources are scarce and/or the QoE for the new media session is expected to poor, to deny service to the new media session. In addition to denying a media session, this action may include providing some form of notification to the subscriber such as a busy notification content, to reduce the negative impact of the policy on the subscriber's satisfaction.

Packet processing element 335 may also support the application of re-multiplexing to subscribers, locations, or media sessions, as governed by policy. A re-multiplexing policy can convert a media session from one container format to another. This action may be useful for example, to re-multiplex all or portions of the audio or video component of the first multimedia stream 180 with all or portions of the video or audio components of the alternative stream etc.

Packet processing element 335 may also support the application of transcoding to some or all media sessions associated with certain subscribers, some or all media sessions associated with certain locations, or individual media sessions, as governed by policy. When a transcode policy action is selected for a media session, packet processing element 335 may, in conjunction with media processing element 330, perform dynamic control of the transcoder to conform to policy targets and constraints. This action may be useful for example additionally where access control action is applied, however network resources are scarce. In such cases, transcoding may be applied to the second multimedia stream such that it may be encoded to fit within available bandwidth.

Packet processing element 335 may also be configured to obtain metadata information from the application layer of the primary request 160. Examples of metadata information contained in the application layer of the primary request 160 may include type of multimedia content identified in the primary request 160, user agent of the requesting device 160 and time of the day of the request etc.

Packet processing element 335 may also be configured to obtain metadata information from the container layer of the first multimedia stream 180 received from the multimedia server 130. Examples of metadata information obtained from the container layer of the first multimedia stream 180 may include length, format and sampling resolution of the first multimedia stream etc.

Metadata information determined by packet processing element 335 may be used to make access control determinations, generally in conjunction with at least one policy.

Packet processing element 335 generate statistics and QoE measurements for media sessions, may provide estimates of bandwidth required to serve a client request and media stream at a given QoE, and may make these values available as necessary within the system. Examples of statistics that may be generated include, e.g., bandwidth, site, device, video codec, resolution, bit rate, frame rate, clip duration, streamed duration, audio codec, channels, bit rate, sampling rate, etc. QoE measurements computed may include e.g. delivery QoE, presentation QoE, and combined QoE.

For deployment in a mobile network (e.g., 3GPP GRPS/UMTS, LTE, etc.) it is beneficial to have subscriber and device information and location as well as other mobility parameters for subscriber, device, and location-based traffic management. This can be accomplished in part by inspecting control plane messages exchanged between gateways (e.g., GTP-C over the Gn interface, GTPv2 over the S4/S11 or S5/S8 interfaces, etc.) or by receiving mobility information from other network nodes (e.g., RNC, MME, etc.). Packet processing element 335 may perform control plane processing. It may receive control plane (e.g., GTP-C) messages and parse relevant control-plane messages exchanged between gateways in order to extract and map subscribers and devices to locations.

The policy system 320 may maintain a set of locally configured node-level policies, and other configuration settings, that are evaluated by a rules engine in order to perform active management of subscribers, location, and media session. Media sessions may be subject to global constraints and affected by dynamic policies triggered during session lifetime. Policy system 320 may keep track of live media session metrics and network traffic measurements. Policy system 320 may use this information to make policy decisions both when each media session starts and throughout the lifetime of the media session, as the GPE may adjust polices in the middle of a media session due to changes in network conditions, changes in business objectives, time-of-day, etc.

Policy system 320 may utilize device data relating to the identified client device, which can be used to determine device capabilities (e.g., screen resolution, codec support, etc.). The device database may comprise a database such as Wireless Universal Resource File (WURFL) or User Agent Profile (UAProf).

The policies available at service gateway system 150 may be dynamically changed by, for example, a network operator. In some cases, policy system 320 may access policies located elsewhere on a network. For example, policy system 320 may apply media session policies in coordination with the 3rd Generation Partnership Project (3GPP) Policy Control and Charging (PCC) architecture eco-system (e.g., with a Policy and Charging Rules Function (PCRF)). In such embodiments, policy system may enforce policy and performance (i.e., carry out a Policy Control Enforcement Function (PCEF) with Application Function (AF), or Application Detection and Control (ADC)).

Policy system 320 may also utilize subscriber information. In some cases, subscriber information may be based on subscriber database data obtained from external subscriber database 130.

The policy system may be configured through a set of external policies that allow the media service gateway to differentiate between how non-media and media traffic is handled, to admit, reject, or limit the amount of resources used by individual media sessions according to their intrinsic characteristics, to regulate the number of media sessions and control the amount of bandwidth used at the location-level (e.g. site), to regulate the number of media sessions and control the amount of bandwidth used at the network level, to progressively apply more aggressive video optimizations as bandwidth usage and/or congestion level increases for a particular location, to establish quality of experience goals and preferences to guide or constraint the video optimization process when making individual media session decisions, etc.

Media session policies may comprise access control, re-multiplexing, transcoding, etc., as described herein.

Media session policy actions may be further scoped or constrained by one or more individual or aggregate media session characteristics, such as:

subscriber (IMEI, IMSI, MSISDN, IP address), subscriber tier, roaming status;
transport protocol, application protocol, streaming protocol;
container type, container meta-data (clip size, clip duration);
video attributes (codec, profile, resolution, frame rate, bit rate);
audio attributes (codec, channels, sampling rate, bit rate);
device type, device model, device operating system, player capabilities;
network location, APN, location capacity (sessions, media bandwidth, delivered bandwidth, congested status);
traffic originating from a particular media site or service, genre (sports, advertising);
time of day; and
QoE metric (PQS, DQS)

The policy system 320 may also be operable to make policy decisions, such as, for example, whether or not to splice all or portions of the first multimedia stream with all or portions of the alternative stream, whether or not to re-multiplex all or portions of the audio or video component of the first multimedia stream with all or portions of the video or audio components of the alternative stream, and whether or not to perform further processing of the first multimedia stream or the second multimedia stream, by, for example, transcoding, etc.

The policy system 320 may, accordingly, be operable to make policy decisions to generate a secondary request, such as the secondary request 165, corresponding to a primary request, such as the primary request 160. The policy system 320 may be further operable to outright deny or discard the primary request. The policy system 320 may be configured to generate a second multimedia stream, such as a busy notification stream, etc.

The policy system 320 may be configured to provide an option to the user and/or requesting device 110 to increase priority of, or reserve a future time slot, during which future time slot the requesting device 110 will be permitted to receive the first multimedia stream 180. The time slot may be a duration of time and may be indicated in absolute or relative terms. For example, the time slot may be a relative time, such as, for example, "15 minutes from now", or an absolute time, such as, for example, "3:00 p.m."

The policy system may be further configured to provide a request-repeat message to the user and/or the requesting device 110. The request-repeat message can identify a time at which the requesting device 110 may be permitted to repeat the primary request 160. Accordingly, if the primary request 160 is repeated prior to this time, it may be discarded without further action by the service gateway system. In some cases, the requesting device 110 may be recorded when the request-repeat message is sent, for example to ensure that the primary request 160 is honored when the requesting device 110 subsequently repeats the request at the appropriate time.

The policy system 320 may be configured to provide an option to the requesting device 110 to receive the multimedia content as requested in the primary request 160 at a reduced download rate, such that instant real-time playback is not possible. For example, if the service gateway system 150 determines that it will not be able to transmit a modified or an unmodified form of the first multimedia stream 180 to the requesting device 110 in real-time, the service gateway system 150 may provide the option to the requesting device 110 to download the requested multimedia content at a reduced download rate. Accordingly, even if not enough bandwidth is available to provide instant playback of the request multimedia stream, a slower download may nevertheless proceed for later playback. The service gateway system 150 may also be operable to provide a download complete notification to the requesting device 110 when the multimedia content is completely downloaded.

Figure 4:
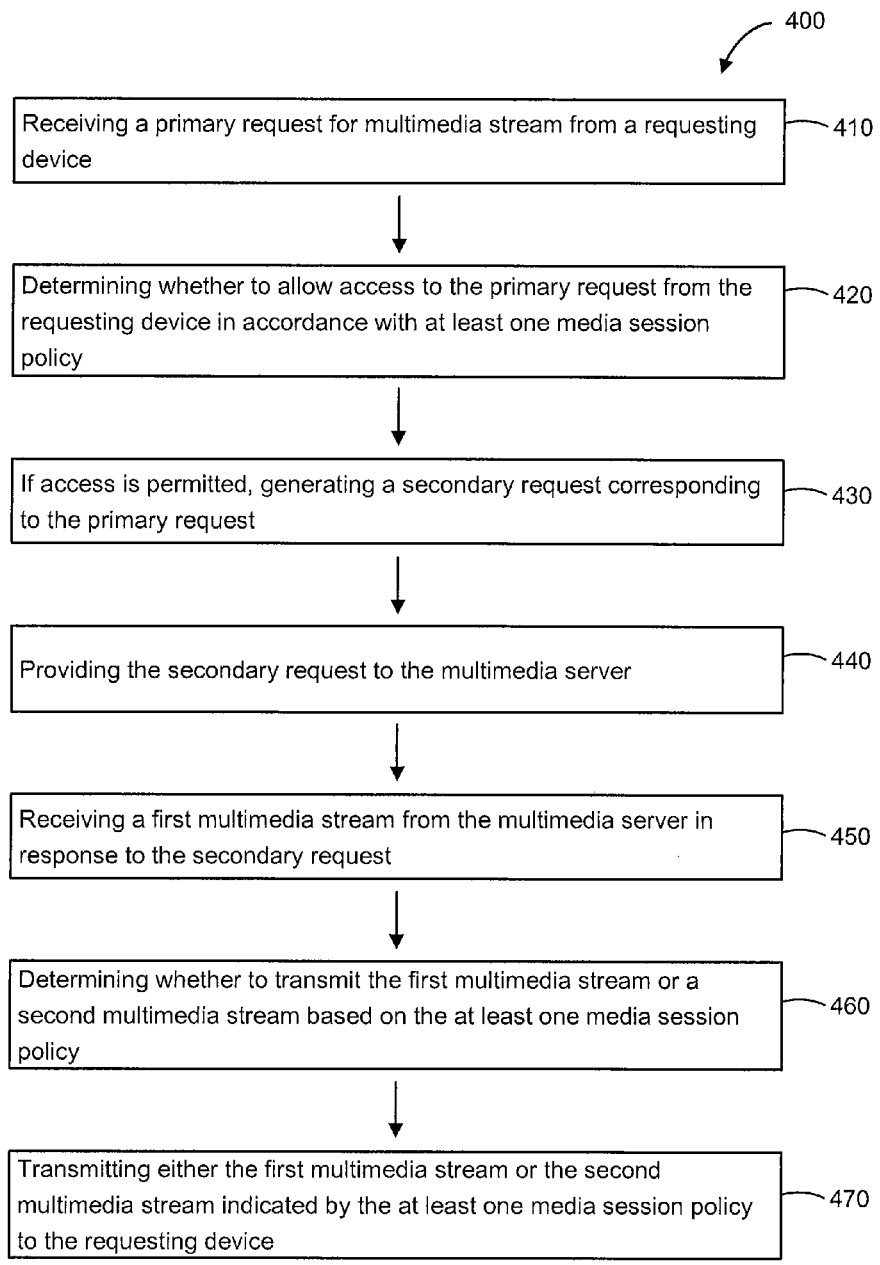
FIG. 4 is a flowchart diagram illustrating an exemplary method.

Reference is now made to FIG. 4, which is a flowchart diagram illustrating acts of a method 400 for the operation of a service gateway system in accordance with an example embodiment. It will be appreciated that many of the acts of the method 400 may be performed in a different order from the order in which they are shown in the figures and from the order in which they are described below. For example, some acts may be performed before the act they are shown to precede, and some method acts may be performed concurrently. Method 400 may be used by systems 100, 200 and 200', and, in particular, the service gateway system 150/250/250', as described above with reference to the examples shown in FIGS. 1, 2A and 2B.

The various acts in the examples of the method 400 described below and shown in the Figures may be combined. For example, a new act described in relation to one example of the method 400 may be incorporated into a different example of the method 400 even if not explicitly stated.

In the example shown, the method 400 comprises receiving 410 a primary request for a multimedia stream from a requesting device, such as requesting device 110. In some cases, the primary request may be received from a requesting client, typically present in a requesting device, which may include a computing application, application plug-in, a widget, instant messaging application, mobile device application, e-mail application, online telephony application, Java™ application, web page, or web object, etc.

The primary request 160 may be received and parsed by the service gateway system 150, for example. The parsed information, including the metadata information contained in the primary request, can be provided to the memory 302 to either add a new user record or update a previously existing user record.

At 420, the service gateway system 150/250 may determine whether to allow access to the primary request 160 from the requesting device 110 in accordance with at least one policy, as described herein.

In some further embodiments, method 400 may include providing a notification (not shown) identifying the status of the primary request 160 and the reason behind denying the primary request 160 to the requesting device 110. For example, a notification may be provided to the requesting device stating that the primary request 160 was not allowed to be forwarded to the multimedia server 130 because of network congestion, or some other reason etc.

Method 400 comprises generating 430 a secondary request 165 corresponding to the primary request 160 if the primary request 160 is allowed. In some cases, the secondary request 165 corresponds directly to the primary request 160. In other cases, the secondary request 165 differs from the primary request 160. The secondary request 165 may be a modified version of the primary request 160, such as, for example, a request for the same multimedia content but in a different format, or different resolution, etc.

Method 400 further comprises providing 440 the secondary request (as generated at 430) to the multimedia server 130. The primary request 160 itself may not be transmitted to the multimedia server.

Method 400 comprises receiving 450 a first multimedia stream 180 from the multimedia server 130 in response to the secondary request 165. In some embodiments, the first multimedia stream 180 may be the same version as requested in the secondary request 165. In some other embodiments, the first multimedia stream 180 is some other version, such as a different format or quality than that requested in the secondary request 165.

Method 400 comprises determining 460 whether to transmit the first multimedia stream (as received at 450 above) or second multimedia stream, based on a policy. Service gateway system 150, and for example policy system 320, may receive the first multimedia stream from the multimedia server and determine whether or not to transmit the first version in unmodified form to the requesting device. The determination may be based on media session policies as described herein.

For example, the service gateway system 150 may determine that the first multimedia stream 180 is to be transmitted in an unmodified form, or that some second multimedia stream is to be transmitted.

Method 400 comprises transmitting 470 either the first multimedia stream 180 or the second multimedia stream to the requesting device, based on the outcome of 460.

As discussed herein, method 400 may comprise generating the second multimedia stream, where the second multimedia stream may comprise a modified version of the first multimedia stream, processed or unprocessed versions of alternative stream, and processed or unprocessed combinations of some or all of the first multimedia stream and some or all of the alternative stream. The alternative stream may comprise busy notification content.

In various embodiments, method 400 further comprises providing a reason or explanation for the busy notification content. The reason for the busy notification content may be a generic reason in some cases (e.g., "Try again later"), or a detailed reason in some other cases. Detailed reasons may be customized based on, for example, aggregate traffic in the requesting device 110 network sector. For example, the detailed reason may be that "There are 20 subscribers currently watching content in your service area". Other reasons may be, for example, that "The multimedia server is undergoing maintenance for the next hour", etc. The busy notification content may be customized based on criteria, such as, for example, subscription tier associated with the requesting device 110, usage pattern associated with the requesting device 110, type of the multimedia stream in the first multimedia stream 180, profile of the requesting device 110, etc.

Figure 5:
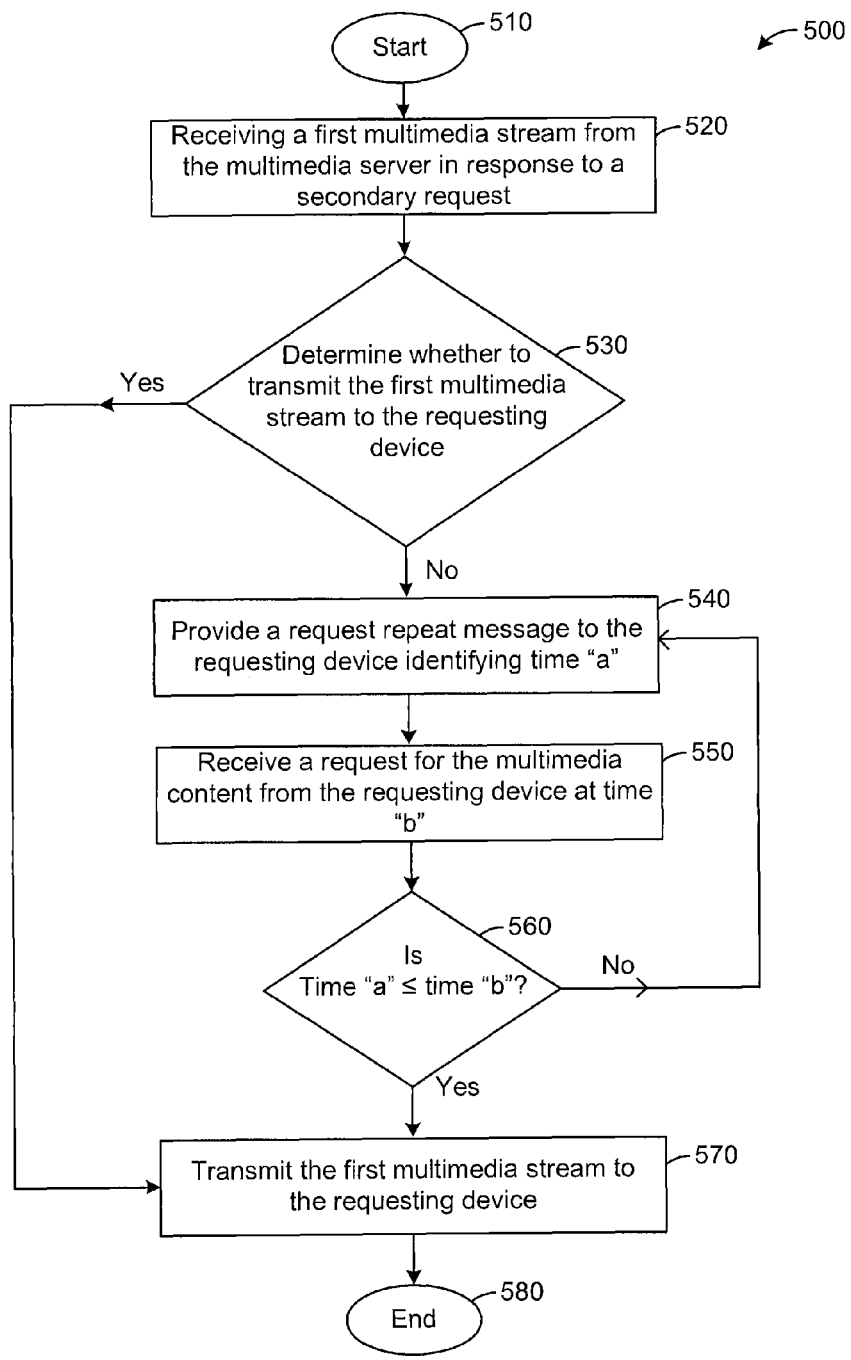
FIG. 5 is a flowchart diagram illustrating an exemplary method.

Reference is next made to FIG. 5, which is a flowchart diagram illustrating acts of a method 500 for the operation of a service gateway system. It will be appreciated that many of the acts of the method 500 may be performed in a different order from the order in which they are shown in the figures and from the order in which they are described below. For example, some acts may be performed before the act they are shown to precede, and some method acts may be performed concurrently. Method 500 may be used by systems 100, 200 and 200', and, in particular, the service gateway systems 150/250/250'. The various acts in the examples of the method 500 described below and shown in the Figures may be combined. For example, a new act described in relation to one example of the method 500 may be incorporated into a different example of the method 500 even if not explicitly stated.

In the example shown, the method 500 begins at 510. At 520, a first multimedia stream 180 is received from the multimedia server 130 in response to a secondary request 165. In some embodiments, the first multimedia stream 180 is the same as that requested in the primary request 160.

Method 500 further comprises determining 530 whether to transmit the first multimedia stream 180, as received from the multimedia server 130, in its original or transcoded form to the requesting device 110. This determination may be based on a policy as described herein. If the policy allows the first multimedia stream 180 in its original or transcoded form to be transmitted to the requesting device 110, the method 500 proceeds to 570. However, if the service gateway system determines that the first multimedia stream 180 in its original or transcoded form cannot be transmitted to the requesting device 110, method 500 proceeds to 540. In some other embodiments, the method 500 may comprise determining 530 only whether the first multimedia stream 180 in its original and unmodified form can be transmitted to the requesting device 110.

Method 500 further comprises providing 540 a request-repeat message to the requesting device 110. The request-repeat message identifies a time or time slot 'a' at which the requesting device 110 may be permitted to repeat or re-attempt the primary request 160. In some cases, when the primary request 160 is repeated at the time 'a' identified in the request-repeat message, the requesting device may receive increased priority or guaranteed playback of the first multimedia stream 180 in its original or transcoded form. Likewise, in some cases, when the primary request 160 is repeated at the time 'a' identified in the request-repeat message, the requesting device may receive increased priority or guaranteed playback of the first multimedia stream 180 in its original or transcoded form after a fixed delay, such as, for example, after playing an advertisement clip.

In some embodiments, the request-repeat message may be provided along with and in addition to busy notification content. For example, the service system gateway 150/250 may indicate to the requesting device 110 to try again at a later time 'a' while providing busy notification content in the meantime. The later time 'a' may be indicated in terms of a relative time, such as, for example, "try again in 15 minutes" or in terms of absolute time, such as, for example, "try again at 9:00 p.m." In some embodiments, the later time 'a' may be indicated using a countdown. The countdown may be based, for example, on an estimate of the state of the network.

At 550, an additional primary request from the multimedia device 110 is received at time 'b' for the same multimedia content for which the request-repeat message was provided at 540. The service gateway system determines whether the request received at 550 identifies the same multimedia content as identified in the primary request 160 for which the request-repeat message was provided (not shown). If the request received at 550 identifies the same multimedia content for which the request-repeat message was provided, method 500 proceeds to 560. However, if the request received at 550 does not identify the same multimedia content for which the request-repeat message was provided, the request received at 550 may be treated as a request for new content or otherwise discarded. Accordingly, in some embodiments, the request received at 550 may, for example, proceed to 420 of method 400.

At 560, the service gateway system 150/250 determines whether the time 'b' at which the request is received is equal to or later than the time 'a' identified in the request-repeat message. If yes, (i.e., if the requesting device 110 transmitted the request at 550 at the same time or within the same time slot during which the requesting device 110 is permitted to repeat or re-attempt the primary request 160), method 500 proceeds to 570. Otherwise, method 500 may proceed to 540 and provide a further request-repeat message to the requesting device identifying the time at which the requesting device 110 is permitted to repeat the primary request 160 (e.g., time 'a').

At 570, the first multimedia stream 180 in its original or transcoded form may be transmitted to the requesting device 110.

In some embodiments, the request-repeat option is provided in relation to the primary request 160. For example, a request-repeat option is provided where if the primary request 160 is repeated at the time or time slot identified in the request-repeat option, the requesting device may receive increased priority or guaranteed playback of the multimedia stream identified in the primary request 160.

Figure 6:
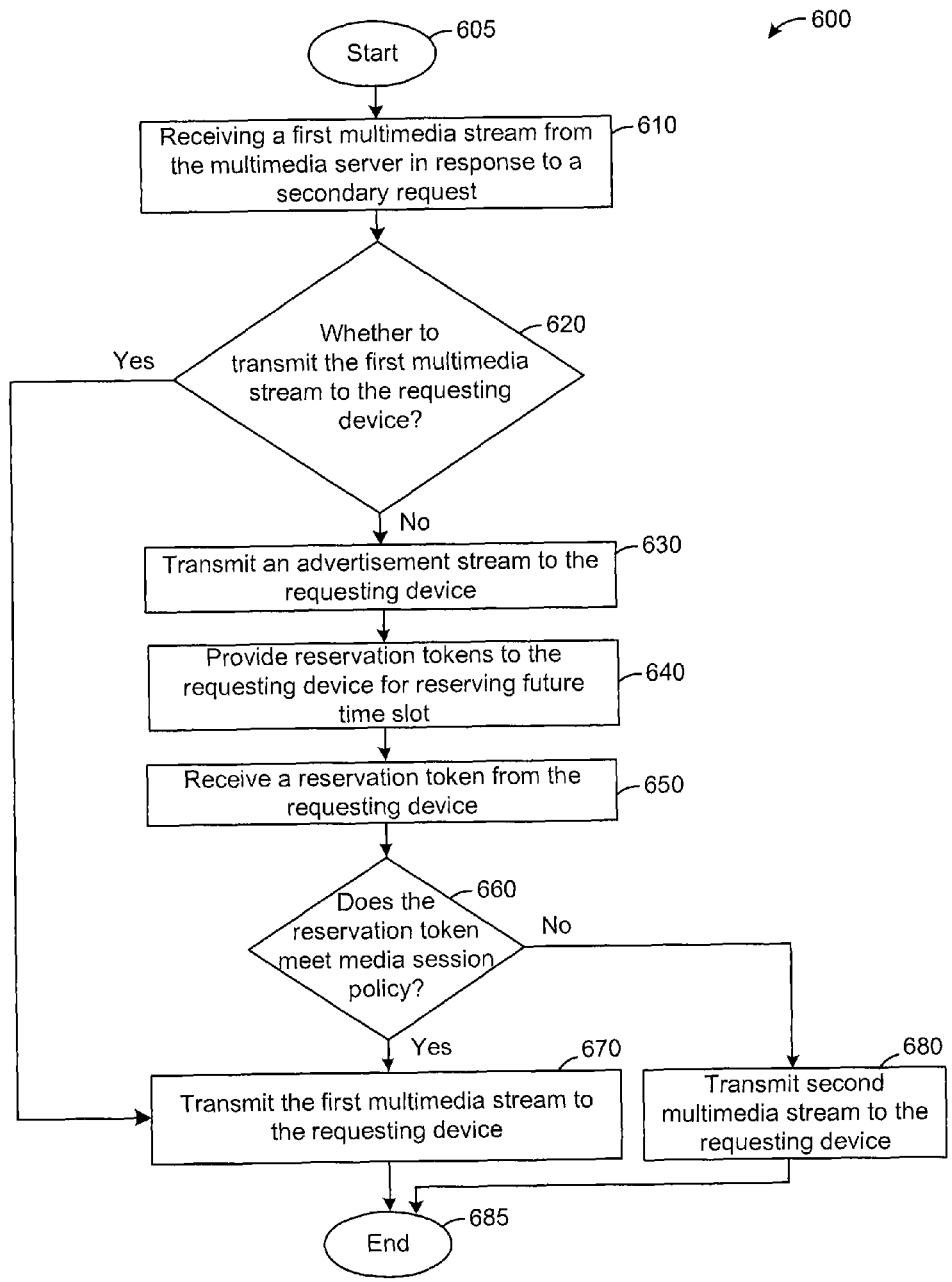
FIG. 6 is a flowchart diagram illustrating an exemplary method.

Reference is now made to FIG. 6, which is a flowchart diagram illustrating acts of a method 600 for the operation of a service gateway system. It will be appreciated that many of the acts of the method 600 may be performed in a different order from the order in which they are shown in the figures and from the order in which they are described below. For example, some acts may be performed before the act they are shown to proceed, and some method acts may be performed concurrently. Method 600 may be used by systems 100, 200 and 200'.

The various acts in the examples of the method 600 described below and shown in the Figures may be combined.

For example, a new act described in relation to one example of the method 600 may be incorporated into a different example of the method 600 even if not explicitly stated.

Method 600 begins at 605. In the example shown, method 600 comprises receiving a first multimedia stream 180 from the multimedia server 130 in response to a secondary request at 610. In some cases, the first multimedia stream 180 is the same version as that identified in the secondary request 165. In some cases, the first multimedia stream 180 accordingly includes the version identified in the primary request 160 if the secondary request 165 is identical to the primary request 160.

Method 600 comprises determining at 620 whether to transmit the first multimedia stream 180 in its original or transcoded form to the requesting device 110 based on a policy. If the policy allows, then the first multimedia stream 180 in its original or transcoded form can be transmitted to the requesting device 110 at 670. However, if the service gateway system determines that the first multimedia stream 180 in its original or transcoded form cannot be transmitted to the requesting device 110, method 600 may proceed to 630. In some other embodiments, method 600 may comprise determining 620 only whether the first multimedia stream 180 in its original and unmodified form can be transmitted to the requesting device 110.

In some embodiments, a reservation token option may be provided in relation to the primary request 160. Reservation tokens may be used to allow prioritization of certain requests. Reservation tokens may be request-specific, in which they relate to a specific primary request. For example, a reservation token may be distributed to a client after an initial unsuccessful attempt to stream a specific item of multimedia content. In addition, or alternatively, reservation tokens may be generic. For example, a generic reservation token may be distributed to a client after an initial unsuccessful attempt to stream any multimedia content, or for other reasons (e.g., class of server). When a reservation token is provided by a client in conjunction with a primary request 160, the requesting device may receive increased priority or guaranteed playback of the multimedia stream identified in the primary request 160.

Method 600 comprises transmitting an advertisement stream to the requesting device 110 for playback at 630 before providing reservation tokens to the requesting devices for reserving future time slots. In some embodiments, as illustrated in this figure, the service gateway system makes reservation tokens available to a requesting device 110 only if the requesting device 110 plays back the transmitted advertisement stream on a display, for viewing by a user. In some other embodiments, transmitting an advertisement stream before providing reservation tokens is optional.

Method 600 further comprises providing reservation tokens to the requesting device for reserving future time slots at 640. In some cases, the number of reservation tokens provided to a requesting device 110 for reserving future time slots is based on a subscription tier associated with the requesting device 110. Alternatively, the number of reservation tokens provided to a requesting device 110 for reserving future time slots may be based on a usage pattern of the requesting device 110. Similarly, other criteria may be used to determine how many reservation tokens a requesting device 110 is entitled to, such as, for example, the network state, the device profile, the historical QoE, the time of the day, the stream type etc. The criteria may be pre-determined or dynamically updated by a network operator or some external source.

In some cases, the future time slot identifies a time slot during which, if the requesting device 110 sends a primary request 160, the requesting device 110 begins receiving multimedia content corresponding to the requested content contained in the primary request 160 (e.g., for instant, real-time playback). In some other cases, the future time slot identifies a time slot during which, if the requesting device 110 transmits a primary request 160, the requesting device 110 begins receiving the first version of the multimedia content 180 in its original or transcoded form for instant playback. The first version of the multimedia content 180 may or may not be the multimedia content identified in the primary request 160.

The future time slot may identify that time slot during which, if the primary request 160 is received, the requesting device 110 may receive increased priority or guaranteed playback of the first multimedia stream 180 after a fixed delay. The requesting device may be notified of the fixed delay, for example, in the form of a queue position indication (e.g., "next in line", "fifth in line", etc.).

Method 600 further comprises receiving one or more reservation tokens from the requesting device 110 to increase priority of a media session or reserve the future time slot at 650.

At 660, the service gateway system determines if the reservation token received at 650 meets a policy, such as a reservation policy. A reservation policy may include rules governing the number of reservation tokens that may be provided or used in a given time period by a particular requesting device. For example, the reservation policy may allow only three reservation tokens to be used per day by a particular requesting device 110, or by a user belonging to the lowest subscription tier. In another example, the reservation policy may only permit three reservation tokens to be issued in a given 30 minute window. Alternatively, a device belonging to a premium subscription tier may be permitted more reservation tokens (e.g., five) in the same 30 minute window.

In some embodiments, the service gateway system may include a reservation token management module (not shown) to issue, monitor and control, for example, the reservation tokens and frequency of use of reservation tokens for each subscriber provided with reservation tokens at 640.

If it is determined at 660 that the reservation token received at 650 satisfies the criteria of a policy, method 600 may proceed to 670. Otherwise, in some embodiments, method 600 proceeds to 680 at which the service gateway system transmits second multimedia stream to the requesting device 110 transmitting the reservation token received at 650.

At 670, the first multimedia stream 180 in its original or transcoded form is transmitted to the requesting device 110. In some other embodiments, the multimedia content identified in the primary request 160 is transmitted to the requesting device 110 at 670. In some further embodiments, the content being transmitted to the requesting device 110 is transmitted after a fixed delay. In some other embodiments, before the content is transmitted to the requesting device 110, the requesting device 110 is sent an advertisement stream to be played back before the content is transmitted by the service gateway system.

Figure 7:
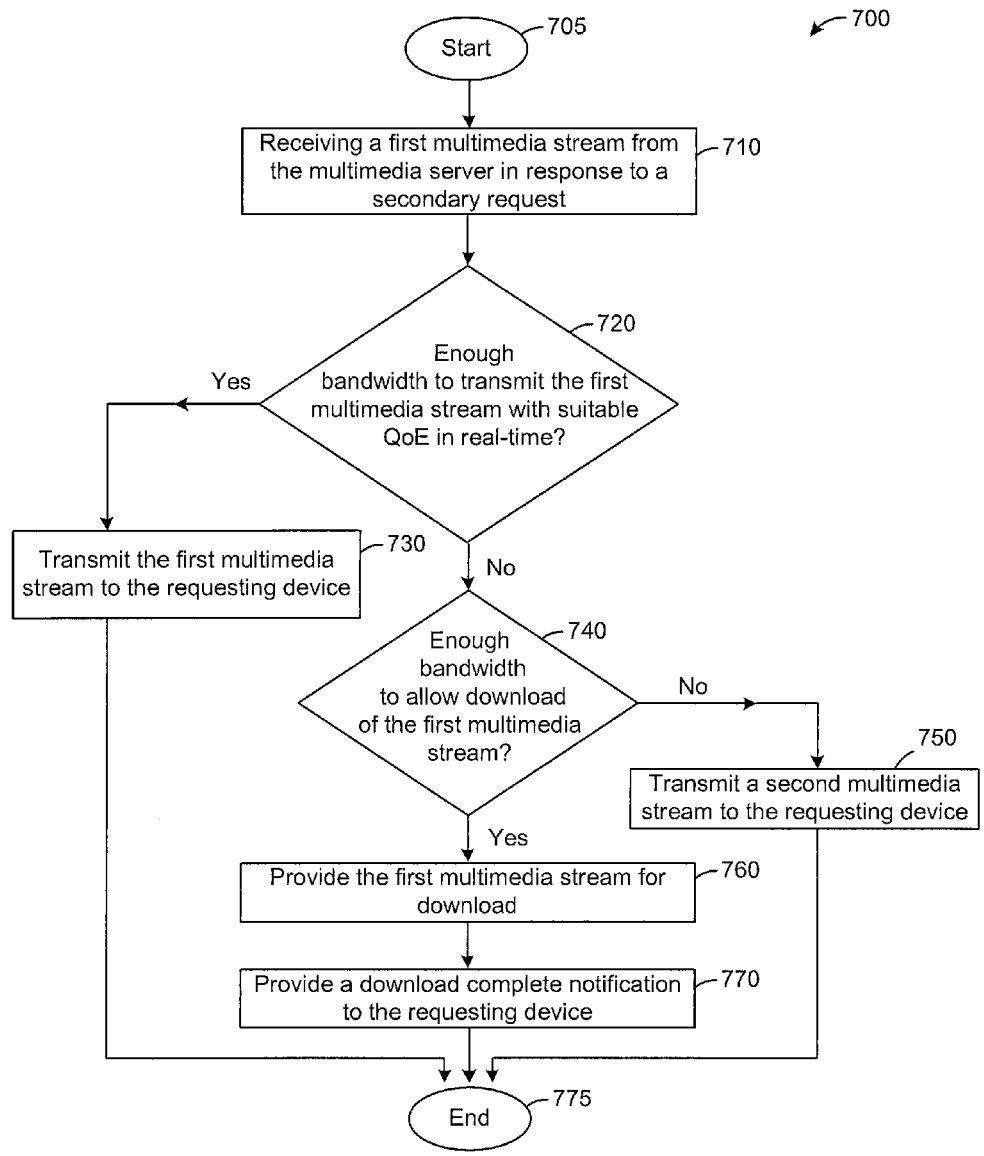
FIG. 7 is a flowchart diagram illustrating an exemplary method.

Reference is now made to FIG. 7, which is a flowchart diagram illustrating acts of a method 700 for the operation of a service gateway system. It will be appreciated that many of the acts of the method 700 may be performed in a different order from the order in which they are shown in the figures and from the order in which they are described below. For example, some acts may be performed before the acts they are shown to precede, and some method acts may be performed concurrently. Method 700 may be used by systems 100, 200 and 200', and, in particular, the service gateway system 150/ 250. The various acts in the examples of the method 700 described below and shown in the Figures may be combined. For example, a new act described in relation to one example of the method 700 may be incorporated into a different example of the method 700 even if not explicitly stated.

Method 700 begins at 705. At 710, a first multimedia stream 180 is received from the multimedia server 130 in response to a secondary request 165. In some embodiments, the first multimedia stream 180 is the same as that requested in the secondary request 165.

At 720, method 700 comprises determining whether there is enough bandwidth to support transmission of the first multimedia stream 180 in real-time with suitable QoE. In some other embodiments, 720 may comprise determining whether there is enough bandwidth to support transmission of a modified version of the first multimedia stream 180 (e.g., second multimedia stream) with suitable QoE in real-time.

If it is determined that the policy can be satisfied by transmitting the first multimedia stream 180 (or its modified version) in real-time, the service gateway system may transmit the first multimedia stream 180 to the requesting device 110 at 730. However, if it is determined that the policy cannot be satisfied by transmitting the first multimedia stream 180 in real-time, method 700 may proceed to 740.

At 740, it is determined whether there is enough bandwidth to allow for the first multimedia stream 180 to be downloaded by the requesting device 110, albeit not in real-time. If the service gateway system determines that there is not enough bandwidth to transmit the first multimedia stream 180 to the requesting device 110 for instant playback, but there is enough bandwidth to support a (slower) download of the first multimedia stream 180 at the requesting device, method 700 proceeds to 760. Otherwise, in some embodiments, method 700 may proceed to 750 and transmit second multimedia stream to the requesting device 110. The second multimedia stream may comprise busy notification content as described herein.

Optionally, the service gateway system may allow the requesting device 110 to confirm the download option before commencing download. In such embodiments, the download begins only after the requesting device 110 confirms the download.

Method 700 further comprises providing 760 the first multimedia stream 180 to the requesting device 110 for download. In various embodiments, the service gateway system may be configured to determine the type of the requesting device 110 and/or the requesting client 105, or type of any player that will be used by the requesting device 110 for playback. Such a determination may be made from the user records stored in the memory 302. In some embodiments, the service gateway system may transcode the first multimedia stream 180 to be downloaded by the requesting device 110 based on the type of the requesting device 110 and/or requesting client 105 and/or the player used on the requesting device 110 for playback.

In some other embodiments, the service gateway system, upon receiving the approval of the requesting device 110 for download, may send a request to the multimedia server 130 to retrieve the first multimedia stream 180 in a format compatible with the type of the requesting device 110 and/or requesting client 105 and/or the player used on the requesting device 110 for playback. Accordingly, the service gateway system may provide the multimedia content to the requesting device 110 in a format suitable for playback after the download.

Optionally, at 770, the service gateway system may provide a download complete notification to the requesting device 110 notifying the requesting device 110 that the download of the first multimedia stream 180 is complete.

In some embodiments, providing the option to download a first multimedia stream 180 to the requesting device 110 may be based on a variety of factors, such as the profile of the requesting device 110 or the subscription tier of the requesting device 110. In some embodiments, the option to download multimedia content may be based on a client used in the requesting device for playback.

In various embodiments, the service gateway system may allow for a combination of options, such as, for example, providing background download in addition to reservation tokens. The described embodiments may also be combined in other ways.

The present invention has been described here by way of example only. Various modification and variations may be made to these exemplary embodiments without departing from the spirit and scope of the invention, which is limited only by the appended claims.

We claim:

1. A method of controlling access to a multimedia stream in a media streaming session from a multimedia server to a requesting device via a network, the method comprising:
   receiving via a mobile data network, by at least one processor of a service gateway system, a primary request for the multimedia stream from the requesting device;
   determining whether to allow access to the primary request from the requesting device in accordance with at least one policy; and
   when the determination is made to permit access, then:
      generating, at the at least one processor, a secondary request based on the determination in accordance with the at least one policy, and corresponding to the primary request;
      providing the secondary request from the service gateway system to the multimedia server via a second data network;
      receiving a first multimedia stream from the multimedia server at the service gateway system in response to the secondary request;
      determining, using the at least one processor, whether to transmit the first multimedia stream from the service gateway system to the requesting device based on the at least one policy and, when the determination is made not to transmit the first multimedia stream, then transmitting via the mobile data network an alternative stream to the requesting device, wherein the alternative stream comprises busy notification content.

2. The method of claim 1, further comprising generating the busy notification content.

3. The method of claim 2, wherein the busy notification content is customized based on a criteria selected from a group consisting of a subscriber, a subscription tier, roaming status, one or more attributes associated with the first multimedia stream, a device type, a device model, a network location, a location capacity, a site, a service, a time of day, and a predicted QoE.

4. The method of claim 1, further comprising transcoding the first multimedia stream to reduce a bandwidth requirement.

5. The method of claim 1, further comprising providing an option to increase priority of at least one future time slot, the at least one future time slot identifying a time slot during which the requesting device begins receiving the first multimedia stream.

6. The method of claim 5, wherein providing an option to increase priority of the at least one future time slot comprises accepting one or more reservation tokens from the requesting device to increase priority of the future time slot.

7. The method of claim 5, further comprising providing a request-repeat message, the request-repeat message identifying a time at which the requesting device is permitted to repeat the primary request.

8. The method of claim 7, further comprising, when the determination is made to transmit the first stream other than in real-time, providing an option to the requesting device to download the first multimedia stream other than in real-time.

9. A system for controlling access to a multimedia stream in a media streaming session from a multimedia server to a requesting device via a network, the system comprising:
  a memory; and
  at least one processor, the at least one processor configured to:
    receive, via a mobile data network, a primary request for the multimedia stream from the requesting device;
    determine whether to allow access to the primary request from the requesting device in accordance with at least one policy, and
    wherein, when the determination is made to permit access at least one processor is configured to:
      generate a secondary request based on the determination in accordance with the at least one policy, and corresponding to the primary request;
      provide the secondary request from the system to the multimedia server via a second data network;
      receive a first multimedia stream from the multimedia server at the system in response to the secondary request;
      determine whether to transmit the first multimedia stream from the system to the requesting device based on the at least one policy and, when the determination is made not to transmit the first multimedia stream, then transmit via the mobile data network an alternative stream to the requesting device, wherein the alternative stream comprises busy notification content.

10. The system of claim 9, wherein the at least one processor is further configured to generate the busy notification content.

11. The system of claim 10, wherein the busy notification content is customized based on a criteria selected from a group consisting of a subscriber, a subscription tier, roaming status, one or more attributes associated with the first multimedia stream, a device type, a device model, a network location, a location capacity, a site, a service, a time of day, and a predicted QoE.

12. The system of claim 9, wherein the at least one processor is further configured to transcode the first multimedia stream to reduce a bandwidth requirement.

13. The system of claim 9, wherein the at least one processor is further configured to provide an option to increase priority of at least one future time slot, the at least one future time slot identifying a time slot during which the at least one processor begins transmitting the first multimedia stream to the requesting device.

14. The system of claim 13, wherein providing an option to increase priority of the at least one future time slot comprises accepting one or more reservation tokens from the requesting device to increase priority of the future time slot.

15. The system of claim 9, wherein the at least one processor is further configured to provide a request-repeat message, the request-repeat message identifying a time at which the requesting device is permitted to repeat the primary request.

16. The system of claim 8, wherein, when the determination is made to transmit the first stream other than in real-time, the at least one processor is further configured to provide an option to the requesting device to download the first multimedia stream other than in real-time.

17. The method of claim 1, further comprising, when the determination is made to transmit the first stream, determining whether to transmit the first stream other than in real-time.

18. The system of claim 9, wherein the at least one processor is further configured to determine, when the determination is made to transmit the first stream, whether to transmit the first stream other than in real-time.

* * * * *